(12) United States Patent
Sung et al.

(10) Patent No.: US 7,486,826 B2
(45) Date of Patent: Feb. 3, 2009

(54) HUMAN DETECTION METHOD AND APPARATUS

(75) Inventors: Young-hoon Sung, Seoul (KR); Tae-kyun Kim, Yongin (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/822,678

(22) Filed: Jul. 9, 2007

(65) Prior Publication Data

US 2007/0258646 A1   Nov. 8, 2007

Related U.S. Application Data

(62) Division of application No. 10/727,530, filed on Dec. 5, 2003.

(30) Foreign Application Priority Data

Dec. 6, 2002   (KR)   ............... 10-2002-0077241

(51) Int. Cl.
  *G06K 9/46* (2006.01)
(52) U.S. Cl. .............. 382/191; 382/103; 382/167; 382/165; 382/117; 382/173
(58) Field of Classification Search ................ 382/191, 382/103, 167, 165, 117, 173
  See application file for complete search history.

(56) References Cited

U.S. PATENT DOCUMENTS 5,164,992 A    11/1992  Turk et al.
5,668,600 A *   9/1997  Lee ................... 375/240.16
5,767,922 A *   6/1998  Zabih et al. ............. 348/700

(Continued)

FOREIGN PATENT DOCUMENTS

KR   P1997-0060927   8/1997

(Continued)

OTHER PUBLICATIONS

Bob Fisher et al., http://www.cee.hw.ac.uk/hipr/html/zeros.html, "Zero Crossing Detector", 1994, pp. 1-4, Department of Artificial Intelligence, University of Edinburgh, UK.

(Continued)

*Primary Examiner*—Matthew C. Bella
*Assistant Examiner*—M Rahmjoo
(74) *Attorney, Agent, or Firm*—Buchanan Ingersoll & Rooney PC (57) ABSTRACT

A human detection method and apparatus are provided. In the method, a person is detected from an image provided by a digital video camera. The method includes (a) initializing parameters used for a user detection; (b) determining a current mode; (c) when it is determined that the current mode is the face detection mode, performing a face detection on each of a plurality of image frames, and when a face is not detected even after a predetermined number of face detection trials, selecting a motion detection mode and going back to step (b); and (d) when it is determined that the current mode is the motion detection mode, performing a motion detection on a predetermined number of image frames at a time, and when at least a predetermined number of motion detections are performed successfully within a predetermined period of time, going back to step (a).

18 Claims, 9 Drawing Sheets

U.S. PATENT DOCUMENTS

| | | | |
|---|---|---|---|
| 5,995,115 | A | 11/1999 | Dickie |
| 7,280,696 | B2 | 10/2007 | Zakrzewski et al. |
| 2002/0126893 | A1 | 9/2002 | Held et al. |
| 2003/0214583 | A1* | 11/2003 | Sadok ........................ 348/143 |

FOREIGN PATENT DOCUMENTS

| | | |
|---|---|---|
| KR | P1998-082154 | 11/1998 |
| KR | P2000-0050405 | 8/2000 |
| KR | P2000-0061100 | 10/2000 |

OTHER PUBLICATIONS

Chinese Office Action dated Mar. 21, 2008 with English translation.

Sung Uk Lee et al., "Real-Time Facial Feature Detection for Person Identication System", IAPR Workshop on Machine Vision Application, Nov. 2000, 4 pages, Tokyo, Japan XP-002340583.

Bernd Heisele et al., "Feature Reduction and Hierarchy of Classifiers for Fast Object Detection in Video Images", Proceedings of the IEEE Computer Conference on Computer Vision ansd Pattern Recognition, Dec. 8, 2001, pp. II-18 to II-24, vol. 1 of 2, IEEE Comp. Soc. US, Los Alamitos, CA, XP-010584095.

Leonardo C. Topa et al., "Edge Detection and Thinning In Time-Varying Image Sequences Using Spatio-Temporal Templates", Pattern Recognition, 1989, pp. 143-154, vol. 22, No. 2, Pergamo Press plc, Great Britain, XP-002340584.

N. Bassiou et al., "Frontal Face Detection Using Support Vector Machines and Back-Propagation Neural Networks", Proceedings 2001 International Conference on Image Processing, Oct. 7-10, 2001, pp. 1026-1029, vol. 1 of 3, Conf. 8, IEEE, U.S., XP-010565037.

Gabor, "*Eye Detection Based on Gabor Transforms*", Journal of Circuits and Systems, Dec. 2001, vol. 6, No. 4.

Heisele, Bernd et al., "*Feature Reduction and Hierarchy of Classifiers for Fast Object Detection in Video Images*", Proceedings of the IEEE Computer Conference on Computer Vision and Pattern Recognitions, Aug. 21, 2001, Los Alamitos, CA, IEEE.

Topa, Leonardo C., et al., "*Edge detection and thinning in time-varying image sequences using spatio-temporal templates*", Pattern Recognition, 1989, Abstract only, vol. 22, Issue 2.

* cited by examiner

HUMAN DETECTION METHOD AND APPARATUS

CROSS-REFERENCE TO RELATED APPLICATIONS

This application claims the benefit of Korean Patent Application No. 10-2002-0077241, filed on Dec. 6, 2002, in the Korean Intellectual Property Office, and as a divisional application of U.S. application Ser. No. 10/727,530, filed Dec. 5, 2003, the entire contents of which is incorporated herein by reference.

BACKGROUND OF THE INVENTION

1. Field of the Invention

The present invention relates to human detection, and more particularly, to a human detection method and apparatus using an image input from a digital video camera.

2. Description of the Related Art

Korean Patent Publication Nos. 2000-50405 and 1997-60927 disclose motion detection methods. Korean Patent Publication No. 2000-50405 discloses a motion detection method using a security camera regardless of an ambient brightness. In this method, each image frame is sampled, a variation between pixels in each sampled image frame is obtained, a variation between pixels in a previous image frame is compared with a variation between pixels in a current image frame, and a difference between the two variations is compared with a predetermined reference value. Korean Patent Publication No. 1997-60927 discloses a selective recording apparatus and method, in which only an image, from among images picked up via a camera, having an image signal different than a reference image is recorded. However, since these two methods use a change in a pixel value between two consecutive images, a change in the pixel value even due to a noise-like change such as a change in illumination is detected as a motion.

Korean Patent Publication Nos. 1998-82154 and 2000-61100 disclose a method of controlling a user's access to a particular service machine connected to a security system. Korean Patent Publication No. 1998-82154 discloses a user identification system and an automatic teller machine (ATM) using the same. The user identification system operates in association with the ATM. The user identification system acquires a face figure via a monitoring camera used to record an ATM user's face image, analyzes the face figure to determine whether a feature which can be confirmed later exists in the face figure, and allows a user's order to be processed only when it is determined that the confirmable feature exists. Korean Patent Publication No. 2000-61100 discloses a method of recognizing a user's face in a banking system. In the method, it is determined whether the eyes and the mouth are clearly detected in a face image obtained by photographing a user. When the eyes and the mouth cannot be clearly detected, for example, when the user covers his/her face with the hand, wears a hat or a mask, or does not show a clear-cut appearance of his/her face, an operation of the banking system is interrupted, thereby preventing financial crimes. However, although these two methods are provided to prevent possible law violations, they are disadvantageous in that honest people who wear sunglasses, masks, or hats without no intention of breaking the law can also be inconvenienced.

SUMMARY OF THE INVENTION

The present invention provides a human detection method using a digital camera, by which an actual motion is accurately detected without being affected by a noise-like change such as a change in illumination, information such as an individual's face can be accurately detected and stored, and storage use efficiency of images acquired using the digital camera is increased.

The present invention also provides a human detection apparatus using the human detection method.

According to an aspect of the present invention, there is provided a method of detecting a person from an image provided by a digital video camera. The method includes (a) initializing parameters used for a user detection; (b) determining a current mode; (c) when it is determined that the current mode is the face detection mode, performing a face detection on each of a plurality of image frames, and when a face is not detected even after a predetermined number of face detection trials, selecting a motion detection mode and going back to step (b); and (d) when it is determined that the current mode is the motion detection mode, performing a motion detection on a predetermined number of image frames at a time, and when at least a predetermined number of motion detections are performed successfully within a predetermined period of time, going back to step (a).

Preferably, step (c) includes detecting a face candidate region using a Gabor wavelet transformation.

Preferably, step (c) includes detecting a face using a low-resolution support vector machine (SVM) and a high resolution SVM.

According to another aspect of the present invention, there is provided a method of detecting a motion from an image provided by a digital video camera. The method includes receiving a predetermined number of image frames; detecting a motion in the image frames using the temporal edge detection algorithm and variance of pixel values with respect to time; determining whether a motion has been detected; and when it is determined that a motion has been detected, storing the image.

According to still another aspect of the present invention, there is provided an apparatus for detecting a person from an image provided by digital video camera. The apparatus includes a means for initializing parameters used for a user detection; a detection mode determination means for determining a current mode; a face detection mode for performing a face detection on each of a plurality of image frames when it is determined that the current mode is a face detection mode and selecting a motion detection mode when a face is not detected even after a predetermined number of face detection trials; and a motion detection means for performing a motion detection on a predetermined number of image frames at a time when it is determined that the current mode is not the face detection mode and initializing the parameters when at least a predetermined number of motion detections are performed successfully within a predetermined period of time.

According to still another aspect of the present invention, there is provided an apparatus of detecting a motion from an image provided by a digital video camera. The apparatus includes a means for receiving a predetermined number of image frames; a means for detecting a motion in the image frames using the temporal edge detection algorithm and variance of pixel values with respect to time; a means for determining whether a motion has been detected; and a means for storing the image when it is determined that a motion has been detected.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

The present invention directs to a human detection method using an image input from a digital video camera. It is most preferable to detect an individual's face in the image. It is an objective of the present invention to detect the individual's motion and figure in the image even if the face cannot be accurately detected. In order to achieve these objectives, the present invention includes face detection and motion detection, which are complementarily performed, thereby providing a method of more accurately and efficiently detecting an individual from an input image. In addition, only an image from which a face or a motion is detected is stored, thereby remarkably increasing storage use efficiency.

Figure 1:
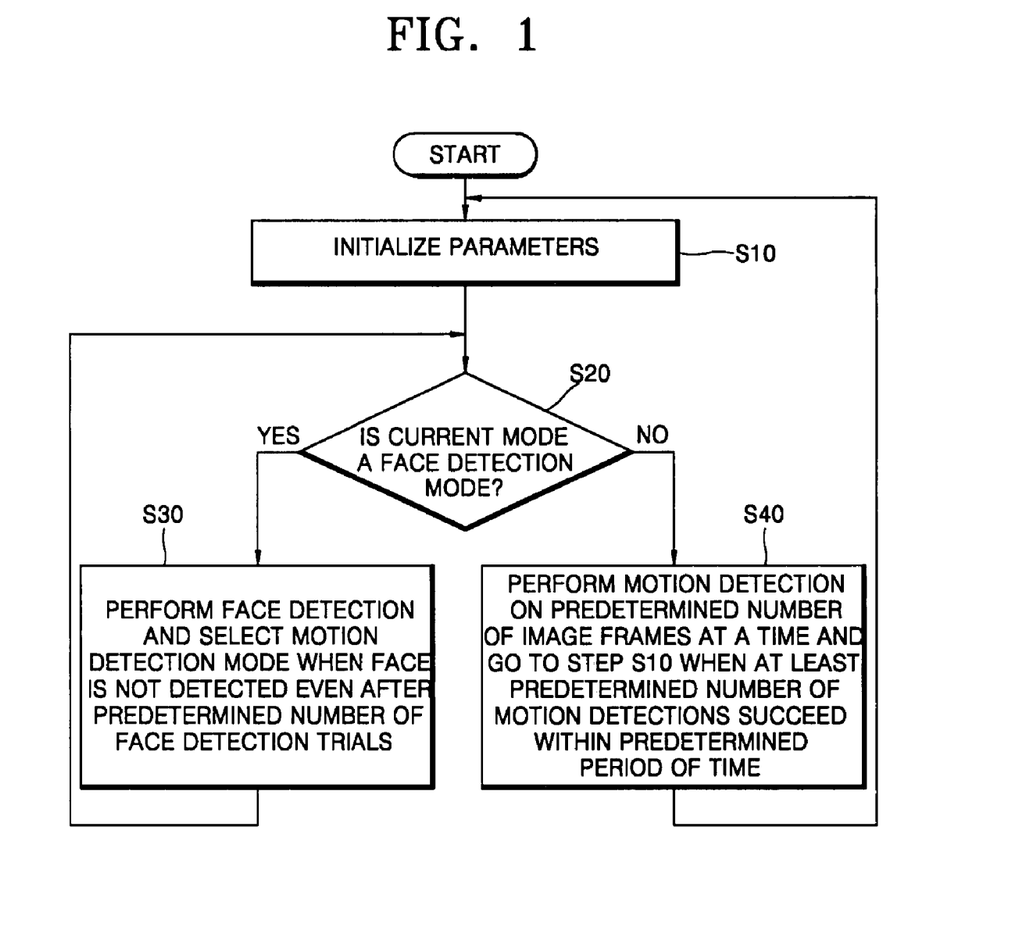
FIG. 1 is a flowchart of a human detection method according to an embodiment of the present invention.

FIG. 1 is a flowchart of a human detection method using a digital video camera, according to an embodiment of the present invention. The method includes initializing parameters (S10), determining a detection mode (S20), detecting a face (S30), and detecting a motion (S40).

More specifically, parameters used to detect a person are initialized (S10). The parameters include a detection mode DETECT_MODE, the number of face detection trials COUNT_FD, the number of motion detection trials COUNT_MD, and the number of motion detection successes SUCCESS_MD. Here, "FD" indicates a face detection, and "MD" indicates a motion detection. In step S10, all of the parameters are initialized to, for example, "0". When the detection mode DETECT_MODE is "0", a system using the method operates in a face detection mode. When the detection mode DETECT_MODE is "1", the security system operates in a motion detection mode. The order of performing face detection and motion detection is not essential to the method. However, for clarity of the description, an initial detection mode DETECT_MODE is set to "0" so that the face detection is performed first when the system is turned on.

After step S10, it is determined whether the detection mode DETECT_MODE is the face detection mode (S20). If it is determined that the detection mode DETECT_MODE is the face detection mode, the face detection is performed (S30). If it is determined that the detection mode DETECT_MODE is not the face detection mode, the motion detection is performed (S40).

Figure 2:
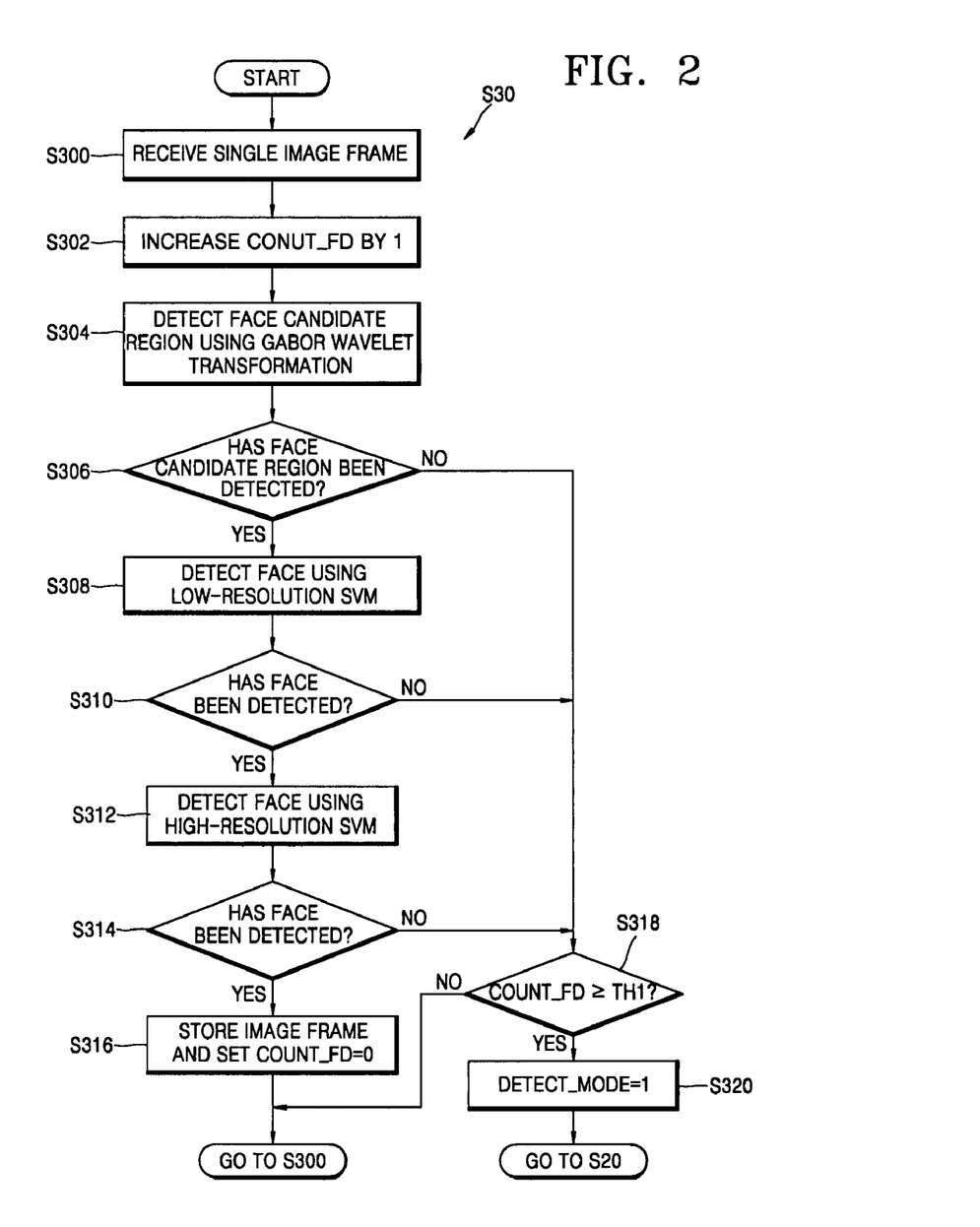
FIG. 2 is a flowchart of an embodiment of step S30 shown in FIG. 1.

In step 30, when a face is not detected after a predetermined number of face detection trials, the motion detection mode is selected, and the operation goes back to step S20. In addition, step 30 includes detecting a face candidate region using a Gabor wavelet transformation and detecting a face using a low-resolution support vector machine (SVM) and a high-resolution SVM. In step S40, the motion detection is simultaneously performed on a predetermined number of image frames, and the operation goes back to step S10 when at least a predetermined number of motion detections succeed within a predetermined period of time. FIG. 2 is a flowchart of an embodiment of step S30 shown in FIG. 1. The embodiment of step S30 includes receiving a single image frame, detecting a face from the image frame, storing the image frame when the face is detected, repeating the face detection, and selecting the motion detection mode when a face is not detected from any of a predetermined number of image frames (S300 through S320).

In step S30, a single face detection is performed on a single image frame, and the number of consecutive face detections is restricted to a predetermined threshold value TH1. The face detection in step 30 is performed through three steps: a rough detection (S304), a moderate detection (S308), and a detailed detection (S312). Accordingly, time taken for the face detection can be reduced, and simultaneously, a satisfactory face detection rate can be maintained. The operation of the face detection (S30) will be described in detail with reference to FIG. 2.

A single image frame photographed for the face detection is received (S300). A single face detection is performed on a single image frame.

After step S300, the number of face detection trials COUNT_FD is increased by one (S302). Step S302 is provided to restrict the number of consecutive face detections to the predetermined threshold value TH1. When face detection is tried using a new image frame after a face detection trial failed, the number of face detection trials COUNT_FD is increased by 1.

After step 302, a face candidate region is detected (S304). To detect the face candidate region, a model face database constructed by training a plurality of model face figures is made. In step S304, the image frame is compared with the model face database to detect a face candidate region using a Gabor wavelet transformation, and more particularly, using an M-grid Gabor wavelet transformation. In the M-grid Gabor wavelet transformation, grid intervals for training the model face figures may be determined based on an inter ocular distance and a distance between eyes and a mouth. Step S304 using the M-grid Gabor wavelet transformation will be described in detail with reference to FIGS. 3 and 4.

In order to detect a face candidate region from a continuous image signal, many researches and developments on color or figure of a face on an image have been performed. Although a pixel-level skin color can remarkably reduce a detection space, a human skin color changes according to a photographing environment and the direction and intensity of a light source. In the present invention, a face candidate region is detected using figure information obtained via similarity matching of Gabor filter responses in an M-style grid.

Figure 3:
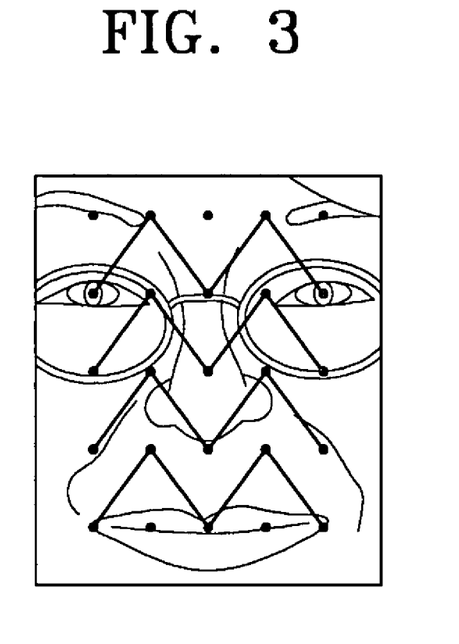
FIG. 3 shows an M-grid.
Figure 4:
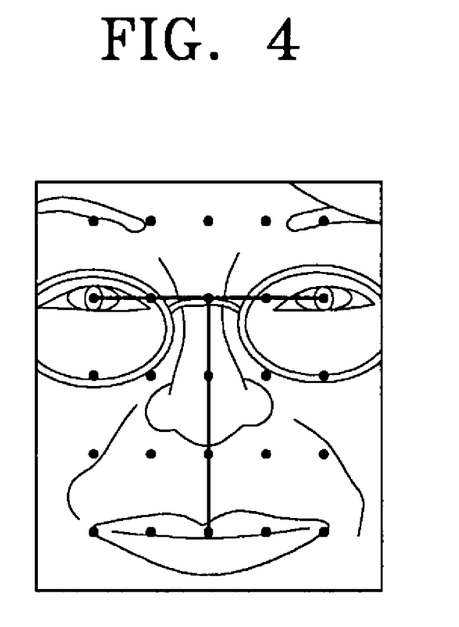
FIG. 4 shows grid intervals in horizontal and vertical directions.

As shown in FIG. 3, an M-grid is composed of a predetermined number of grid points, for example, 20 grid points, forming the shape of a letter "M". The grid points are arranged at predetermined intervals in horizontal and vertical directions. For example, as shown in FIG. 4, horizontal intervals of the grid points may be set to ¼ of an inter ocular distance, and vertical intervals thereof may be set to ⅓ of a distance between a mouth and a line connecting two eyes.

The detection of a face candidate region using a Gabor wavelet transformation includes two steps. In one step, model face images including various changes in a face are trained. Here, a model face database is constructed by performing training with application of an M-grid structure to many images. In the other step, model faces in the model face database are compared with the received image frame using an M-grid similarity matching. Here, even a non-face image portion is detected as the face candidate region if it is determined as having a high similarity with the model faces as the result of performing an M-style grid matching.

After step S304, it is determined whether the face candidate region has been detected using the M-grid Gabor wavelet transformation (S306). According to the M-grid Gabor wavelet transformation, a portion which can be estimated as a face in an image is detected as a face candidate region, regardless of whether the portion is actually a face. In other words, a predetermined portion, which is determined as having a highest probability that it is a face in an entire image, is detected as a face candidate region. As such, even when the face candidate region is detected from the image, it cannot be considered that the image actually include a face. Accordingly, a low-resolution face detection (S308) and a high-resolution face detection (S312) are performed on the detected face candidate region in order to more accurately detect a face. However, if it is determined that the face candidate region has not been detected, the operation goes to step S318, in which the number of face detection trials COUNT_FD is equal to or greater than the predetermined threshold value TH1. Step S318 will be describe later in detail.

In a hierarchical structure of the rough, moderate, and detailed detections, the above-described face detection using the Gabor wavelet transformation is the rough detection at the lowest level. This rough detection does not provide an accurate detection, but it is robust to a change in illumination and other noises and can be completed in a short time. For example, when the received image has a size of 320×240 and a target face has a 40 through 80 pixels between two eyes, the rough detection takes about 170 ms in a Pentium 4, 1.4 GHz computer.

In order to more accurately detect a face from the face candidate region detected using the M-grid Gabor matching, the present invention uses a classification based on an SVM trained in PCA subspaces. PCA is an abbreviation of principal component analysis, which will be described later. The following description relates to an SVM-based face detection method used in steps S308 and S312.

Face images are not randomly distributed in a high dimensional image space, and thus they can be represented in a low dimensional subspace. In SVM based classification, a speed of face detection changes depending on the number of support vectors (SVs). It is an objective of the present invention to increase a classification speed. The classification speed can be increased, and classification performance can be maintained satisfactory, by selecting an appropriate number of SVs. The present invention employs PCA as an appropriate method for reducing a dimension of a face space. A wide spread face recognition technique is a process of applying PCA to a face image. PCA is a technique of projecting image data onto a low dimensional eigenvector space with a minimum loss of unique image information so as to reduce information. When PCA is used to recognize a face, a principal component vector of a face is extracted from an input image and is compared with a principal component vector of an image trained and stored in a database in advance.

A low-resolution SVM based classification increases a classification speed. An image determined as not being a face in a low resolution SVM based classification is eventually not a face. However, even if an image is determined as being an image in the low resolution SVM based classification, the image may not be a face. Under this background, images are filtered off non-face images at a high speed using a low-resolution SVM based classification in step S308. The filtered images may include non-face images. Next, the filtered images are more precisely filtered off non-face images using a high-resolution SVM based classification in step S312. In other words, only patterns classified as a face as the result of a first level classification at a low resolution are subjected to a second level classification at a high resolution. Accordingly, the amount of image data to be processed in the second level classification can be reduced significantly.

For example, a low-resolution SVM trained using 20 PCA features in 20×20-face images is applied to the face candidate region extracted using a Gabor wavelet transformation in step S308. Thereafter, a high-resolution SVM using a second order polynomial kernel trained using 50 PCA features in 40×40-face images is applied in step S312.

In order to perform an SVM-based face detection, it is necessary to provide a face database constructed through training for a system. The face database is constructed via training using face images and non-face images. In a training for a low-resolution SVM, the face and non-face images are resized to a predetermined size, for example, 20×20. Here, the number of vectors is 400. Only a predetermined number of vectors, for example, 20 vectors, among the 400 vectors are selected as feature vectors, and eigenvectors are made.

Next, a position and a scale are adjusted to select a region from which a face is detected in an image, and a face is detected using a low-resolution SVM.

Figure 5A:
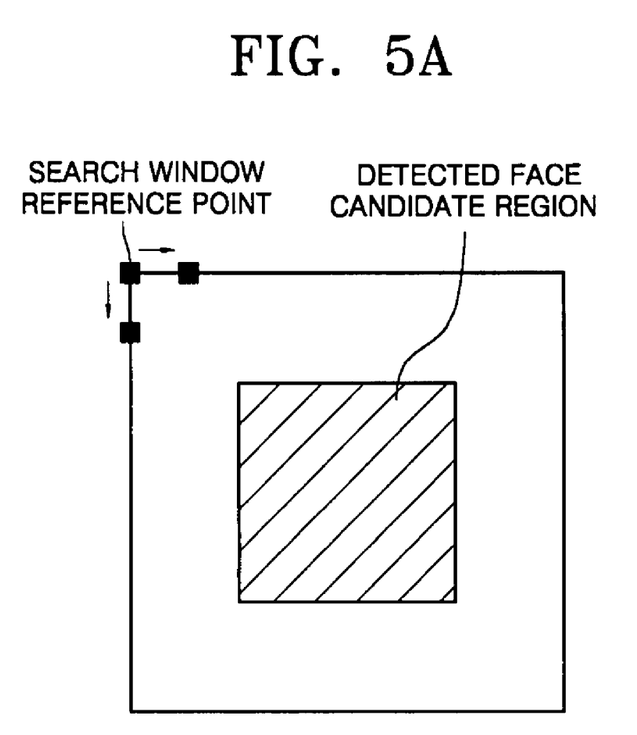
FIGS. 5A and 5B illustrate a procedure of changing a search window defining a face detection area in which a face detection is performed in an image including a face candidate region detected using a Gabor wavelet transformation and an ambient region.
Figure 5B:
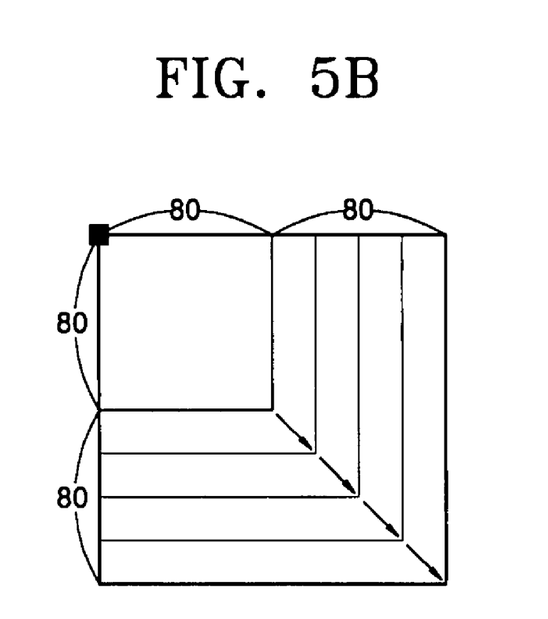

FIGS. 5A and 5B illustrate a procedure of changing a search window for a face detection in an image including a face candidate region detected using a Gabor wavelet transformation and an ambient region. In a face detection using the low-resolution SVM, a search window reference point and a motion range of the search window reference point are determined according to the position and the size of the face candidate region. Referring to FIG. 5A, a small hatched rectangle denotes the face candidate region, and an outer larger rectangle denotes the face detection area in which a face detection is to be performed using the low-resolution SVM. For example, an upper left corner is set as a first search window reference point in FIG. 5A, and the search window can be set to 80×80, as shown in FIG. 5B. Next, image data in the search window is resized to 20×20. The resized image data is compared with SV data resulting from training to detect a face. Thereafter, the search window is extended gradually, and resizing and comparison are repeated. When a maximum limit of the search window is set to 160×160 and the search window is extended by 20 pixels in length and width at a time, the search window are extended from 80×80 to 160×160 step by step, and training and comparison are repeated five times. Since a face detection needs to be performed in an area defined by the outer larger rectangle of FIG.

5A, the search window reference point is moved to the right and down to extend the search window, as shown in FIG. 5B. A face detection is repeated when the search window is extended.

A face detection using a high-resolution SVM in step S312 is performed in the same manner as that using the low-resolution SVM in step S308, with the exception that the number of resizing vectors and the number of eigenvectors increase so that a face is more precisely detected. More specifically, it is necessary to provide a face database constructed through training for a system. The face database is constructed via training using face images and non-face images. In a training for the high-resolution SVM, the face and non-face images are resized to a predetermined size, for example, 40×40. Here, the number of vectors is 1600. Only a predetermined number of vectors, for example, 50 vectors, among the 1600 vectors are selected as feature vectors, and eigenvectors are made.

Next, a position and a scale are adjusted to select a region from which a face is detected in an image, and a face is detected using the high-resolution SVM. A search window reference point and its motion range are selected in the same manner as in the face detection using the low-resolution SVM, as shown in FIGS. 5A and 5B, with the exception that they are selected in a peripheral area of a face region detected using the low-resolution SVM.

As described above, a method of detecting a face according to the present invention includes three steps: detecting a face candidate region (S304), detecting a face using a low-resolution SVM (S308), and detecting a face using a high-resolution SVM (S312), thereby increasing the reliability, accuracy, and speed of a face detection.

Consequently, it is finally determined that a face has been detected only when it is determined that a face has been detected as the result of the detection using the high-resolution SVM (S314). When it is determined that a face has been detected in step S314 even though the current image frame does not actually include a face, a false alarm rate (FAR) increases. When it is determined that a face has been detected with respect to the current image frame actually including a face in step S314, a face detection rate (FDR) increases.

When it is determined that a face has not been detected in step S310 or S314, it is determined whether the number of face detection trials COUNT_FD is equal to or greater than the predetermined threshold value (referred to as a first threshold value) TH1 in step S318. The first threshold value TH1 may be set to, for example, 10.

In step 318, whether the operation moves to a motion detection is determined based on a predetermined number of face detection trials and a predetermined period of time. Whether a subject approaching a terminal is a person cannot be determined 100% by a face detection. When a user wears a mask or sunglasses or stands with the back facing a camera although the user makes a motion, it is difficult to detect a face. In this situation, a face is not detected, but it is necessary to store the image including a motion. Accordingly, when it is determined that a face is not detected from any of a predetermined number of input image frames based on a limit of the number of face detection trials, the face detection is stopped, and a motion detection is performed. Here, the number of face detection trials COUNT_FD is the same as the number of face detection fails. Step S318 is provided in order to limit the number of trials. When a face detection ends in a failure, i.e., when it is determined that the face candidate region has not been detected in step S306, when it is determined that the face has not been detected as the result of detection using the low-resolution SVM in step S310, or when it is determined that the face has not been detected as the result of detection using the low-resolution SVM in step S314, it is determined whether the number of face detection trials COUNT_FD is equal to or greater than the first threshold value TH1 in step S318. When it is determined that the number of face detection trials COUNT_FD is less than the first threshold value TH1, the operation goes to step S300. When it is determined that the number of face detection trials COUNT_FD is equal to or greater than the first threshold value TH1, the operation goes to step S320.

In step S320, the detection mode DETECT_MODE is set to "1" so that the mode is changed to a motion detection mode. In other words, when the face is not detected even after the predetermined number of face detection trials (TH1), the mode is converted into the motion detection mode. Thereafter, the operation goes to step S20. Since the detection mode DETECT_MODE was set to "1", a motion detection is performed according to the result of the determination of step S20.

In the meantime, when it is determined that the face has been detected as the result of detection using the high-resolution SVM in step S314, the current image frame is stored, and the number of face detection trials COUNT_FD is initialized to "0" in step S316. Then, the operation goes to step S300. In other words, when the face is detected, the face detection is continued.

Figure 6:
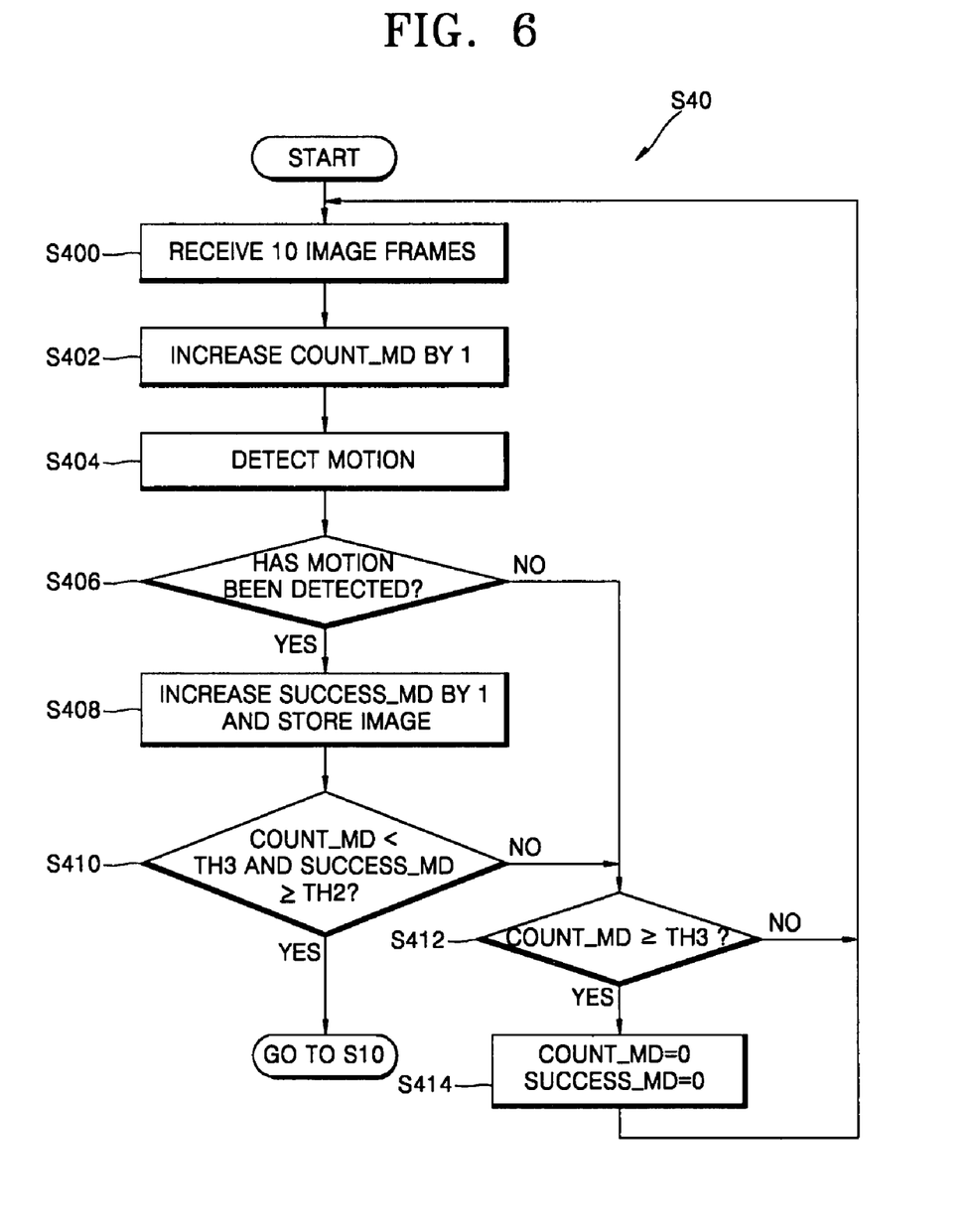
FIG. 6 is a flowchart of an embodiment of step S40 shown in FIG. 1.

FIG. 6 is a flowchart of an embodiment of step S40 shown in FIG. 1. The embodiment of step S40 includes receiving a predetermined number of image frames, detecting a motion according to a temporal edge detection algorithm, going to a face detection if a predetermined number of motion detections succeed within a predetermined period of time, and continuously performing the motion detection if not (S400 through S414)

In the present invention, a motion is detected based on a temporal edge defined by extending a spatial edge to a time domain. Image frames input during a predetermined period of time are grouped and defined as a motion detection unit. A temporal variation among these image frames is evaluated to detect a motion.

In the embodiment of the present invention, a series of image frames, for example, 10 image frames, obtained by photographing a subject approaching the terminal during a predetermined period of time are subjected to a single motion detection. In other words, the motion detection is performed in units of a predetermined number of image frames, for example, 10 image frames. A single image frame includes "n" pixels having a predetermined resolution. Accordingly, when a single motion detection is performed, a temporal variation in 10 pixel values of a pixel of interest is evaluated to determine whether the pixel of interest is a motion pixel. This evaluation is repeatedly performed on the "n" pixels.

In the present invention, a digital camera is characterized by a predetermined number of image frames per unit time. Accordingly, if 30 frames are taken per second, roughly three motion detections can be performed per second.

An embodiment of step S40 shown in FIG. 1 will now be described in detail with reference to FIG. 6. A predetermined image frames, for example, 10 image frames, are received (S400). Next, the number of motion detection trials COUNT_MD is increased by 1 (S402). Next, a motion in the image frames is detected using a temporal edge detection algorithm (S404).

A spatial edge is a boundary between two regions having different brightness. The spatial edge can be detected using a Sobel mask, a Prewitt mask, a Laplacian mask, or a Canny mask. In case of edge detection using a Laplacian, the concept of spatial edge can be extended to the concept of temporal edge, accordingly, a motion in image frames can be detected using this temporal edge detection.

Figure 7:
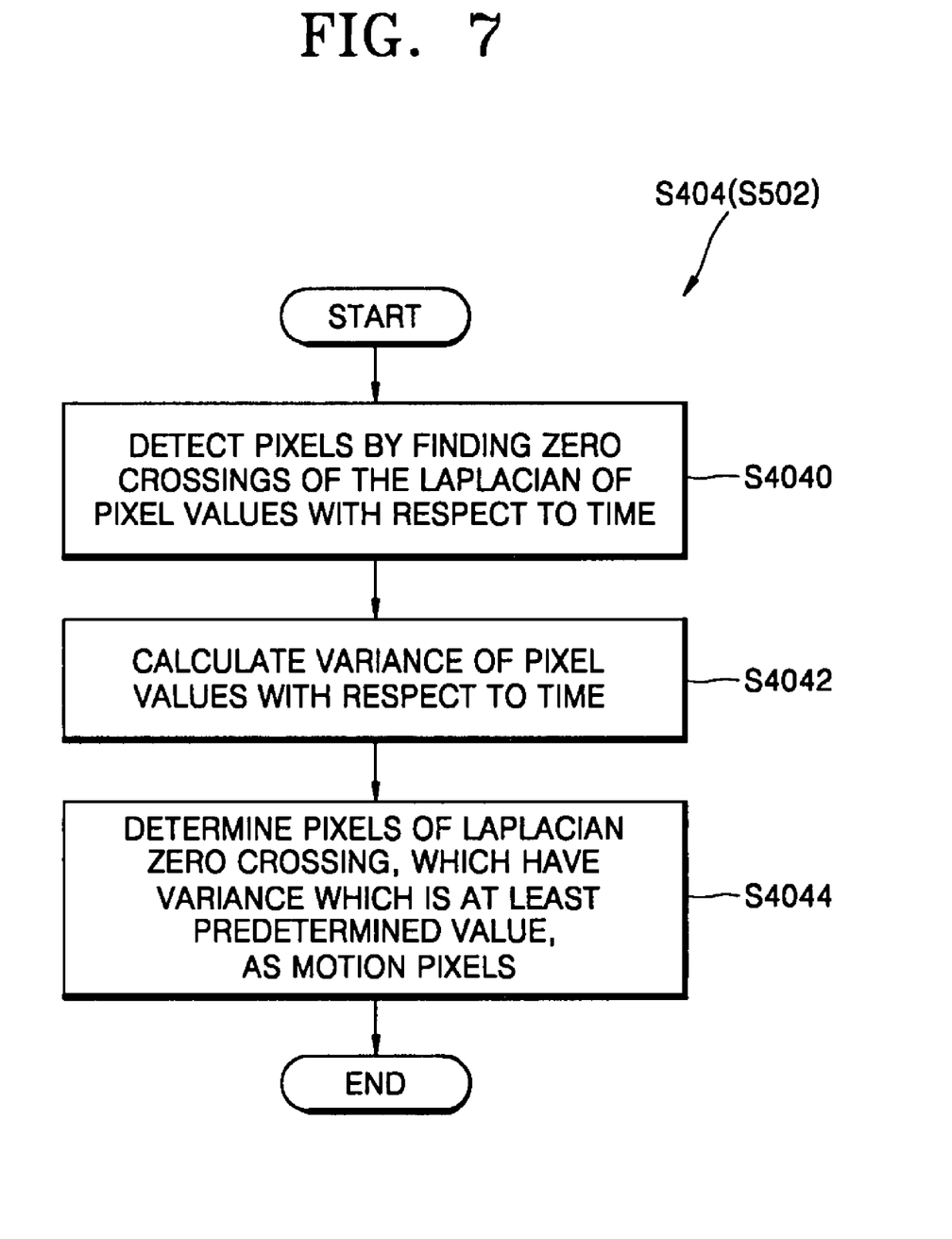
FIG. 7 is a flowchart of an embodiment of step S404 shown in FIG. 6.

FIG. 7 is a flowchart of an embodiment of step S404. The embodiment of step S404 includes detecting pixels by finding zero crossings of the Laplacian with respect to time, comparing a local variance at these points with a predetermined value, and considering pixels having the local variance equal to or greater than the predetermined value as motion pixels (S4040 through S4044).

More specifically, pixels determined by finding zero crossings of the Laplacian with respect to time are detected using the predetermined number of image frames in step 4040.

Figure 8:
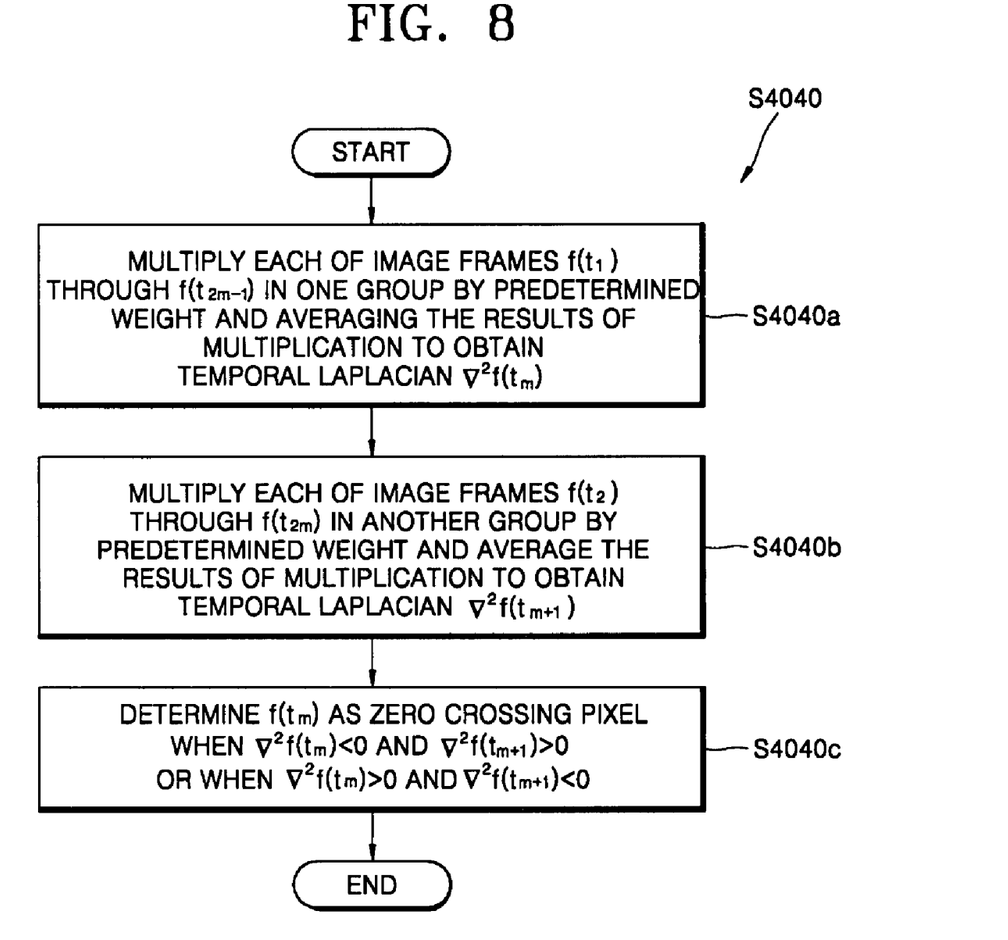
FIG. 8 is a flowchart of an embodiment of step S4040 shown in FIG. 7.

FIG. 8 is a flowchart of an embodiment of step S4040 shown in FIG. 7. On the assumption that 2m image frames are received (where "m" is a positive integer) and "n" pixels exist in each image frame, the embodiment of step S4040 includes classifying the 2m image frames into two groups; one group of $f(t_1)$ through $f(t_{2m-1})$ the other group of $f(t_2)$ through $f(t_{2m})$, obtaining the Laplacian with respect to time of the two groups, and determining zero crossings or non-zero crossings of the Laplacian (S4040a through S4040c). Here, $f(t_1)$ through $f(t_{2m})$ denote pixel values of a current pixel of interest under processing in the 2m image frames. Steps S4040a through S4040c are repeated as many times as the number of pixels in each image frame, i.e., "n" times in a single motion detection. The embodiment of step S4040 will now be described in detail.

Formulae (1) and (2) are examples of a calculation for detecting a spatial edge using a typical 3×3 Laplacian mask.

$$\nabla^2 f = 4z_5 - (z_2 + z_4 + z_6 + z_8) \tag{1}$$

$$\nabla^2 f = 8z_5 - (z_1 + z_2 + z_3 + z_4 + z_6 + z_7 + z_8 + z_9) \tag{2}$$

In step S4040a, each of image frames $f(t_1)$ through $f(t_{2m-1})$ in one group is multiplied by a predetermined weight and then averaged, thereby obtaining a temporal Laplacian of $f(t_m)$. In order to detect a temporal edge by extending the typical 3×3 Laplacian mask to a temporal domain, the number of image frames included in one group is set to 9. For example, when m=5, each of the 9 image frames $f(t_1)$ through $f(t_9)$ is multiplied by the predetermined weight and then averaged, thereby obtaining a temporal Laplacian of $f(t_5)$, that is, $\nabla^2 f(t_5)$. $\nabla^2 f(t_5)$ can be calculated using Formula (3) or (4).

$$\nabla^2 f(t_5) = 4f(t_5) - (f(t_2) + f(t_4) + f(t_6) + f(t_8)) \tag{3}$$

$$\nabla^2 f(t_5) = 8f(t_5) - (f(t_1) + f(t_2) + f(t_3) + f(t_4) + f(t_6) + f(t_7) + f(t_8) + f(t_9)) \tag{4}$$

Another temporal Laplacian of pixel values is needed to detect a pixel with a zero crossing of the Laplacian. Thus, in step S4040b, each of image frames $f(t_2)$ through $f(t_{2m})$ in another group is multiplied by the predetermined weight and then averaged, thereby obtaining a temporal Laplacian of $f(t_{m+1})$. In order to use the typical 3×3 Laplacian mask, for example, each of 9 image frames $f(t_2)$ through $f(t_{10})$ is multiplied by the predetermined weight and then averaged, thereby obtaining a temporal Laplacian of $f(t_6)$, that is, $\nabla^2 f(t_6)$. $\nabla^2 f(t_6)$ can be calculated using Formula (5) or (6).

$$\nabla^2 f(t_6) = 4f(t_6) - (f(t_3) + f(t_5) + f(t_7) + f(t_9)) \tag{5}$$

$$\nabla^2 f(t_6) = 8f(t_6) - (f(t_2) + f(t_3) + f(t_4) + f(t_5) + f(t_7) + f(t_8) + f(t_9) + f(t_{10})) \tag{6}$$

In step S4040c, zero crossings or non-zero crossings of the Laplacian are determined. More specifically, when $\nabla^2 f(t_m)$ is negative and $\nabla^2 f(t_{m+1})$ is positive, or when $\nabla^2 f(t_m)$ is positive and $\nabla^2 f(t_{m+1})$ is negative, a pixel of interest is determined as a zero crossing pixel. In other words, when m=5, a zero crossing pixel is determined depending on whether a zero crossing occurs between $\nabla^2 f(t_5)$ and $\nabla^2 f(t_6)$. When it is determined that a zero crossing has occurred, a pixel of interest $f(t_m)$ is detected as a motion pixel.

In step S4042, the variance of pixel values with respect to time is calculated using the predetermined number of image frames. Step S4042 can be performed after or in parallel with step S4040. The variance σ can be calculated using Formula (7).

$$\sigma = \frac{\sum_{i=1}^{2m-1}(x - f(t_i))^2}{2m-1}, x = \frac{\sum_{i=1}^{2m-1} f(t_i)}{2m-1} \tag{7}$$

After steps S4040 and S4042, it is determined whether the variance calculated for each of the pixels detected by finding zero crossings of the Laplacian is equal to or greater than a predetermined threshold value, and if it is determined the variance is equal to or greater than the predetermined threshold value, the pixel is determined as a motion pixel in step S4044. If it is determined that the variance is less than the predetermined threshold value, it is determined that although there is a temporal change in a pixel, this change is a noise-like change caused by, for example, illumination, not by an actual motion of a subject. Due to step S4044, a method of detecting a motion according to the present invention is robust to noise such as a change in illumination or environment.

After step S404, it is determined whether a motion has been detected in step S406. Step S406 can be embodied to include determining whether the number of pixels determined as motion pixels in step S404 is equal to or greater than a predetermined value and determining that a motion has been detected when the number of motion pixels is at least the predetermined value.

When it is determined that a motion has been detected, the number of motion detection successes SUCCESS_MD is increased by 1 and an image is stored in step S408. Here, the stored image is a image frame $f(t_m)$. When m=5, an image frame $f(t_5)$ is stored.

After step S408, it is determined whether conditions that the number of motion detection trials COUNT_MD is less than a third threshold value TH3, for example, 30 (COUNT_MD<30), and the number of motion detection successes SUCCESS_MD is equal to or greater than a second threshold value TH2, for example, 10 (SUCCESS_MD≧10), are satisfied in step S410. If it is determined that the conditions are satisfied, the operation goes to step S10. In other words, when the conditions are satisfied, the purpose of the motion detection mode is achieved. When a predetermined number of motion detections have been performed successfully within a predetermined time, it is determined that the conditions of a face detection has been fulfilled, and a face detection is performed because it is an ultimate purpose of the security system to accurately detect a face. In step S10, all of the parameters are initialized, and thus the operation is performed in the face detection mode.

When it is determined that a motion has not been detected in step S406, or when it is determined that the conditions are not satisfied in step S410, it is determined whether the number of motion detection trials COUNT_MD is equal to or greater than the third threshold value TH3 in step S412. When it is determined that the number of motion detection trials COUNT_MD is less than the third threshold value TH3, the operation goes to step S400.

However, when it is determined that the number of motion detection trials COUNT_MD is equal to or greater than the third threshold value TH3, the number of motion detection trials COUNT_MD and the number of motion detection successes SUCCESS_MD are initialized in step S414, and then the operation goes to step S400. It is an object of the present invention to successfully perform a predetermined number of motion detections within the "predetermined period of time". When a motion is detected eventually after a long period of time since the beginning of the motion detection mode, it is considered that there is no possibility that a face can be detected. Accordingly, when the predetermined period of time lapses before a predetermined number of motion detections are performed successfully, that is, when the number of motion detection trials COUNT_MD is equal to or greater than the third threshold value TH3, count values related to a motion detection are initialized so as to perform a new motion detection.

Meanwhile, it is necessary to perform a face detection in the middle of performing a motion detection in order to efficiently detect a user. In other words, it is necessary to prepare a situation in which a user approaching a terminal does not move for a predetermined period of time. Accordingly, step S40 can be embodied to include interrupting the motion detection with a predetermined period and performing a face detection.

Since the Laplacian is sensitive to noise, step S404 may further includes performing a Gaussian filtering on the image frames to smooth the image frames before obtaining the Laplacian of a pixel value in step S4040.

Figure 9:
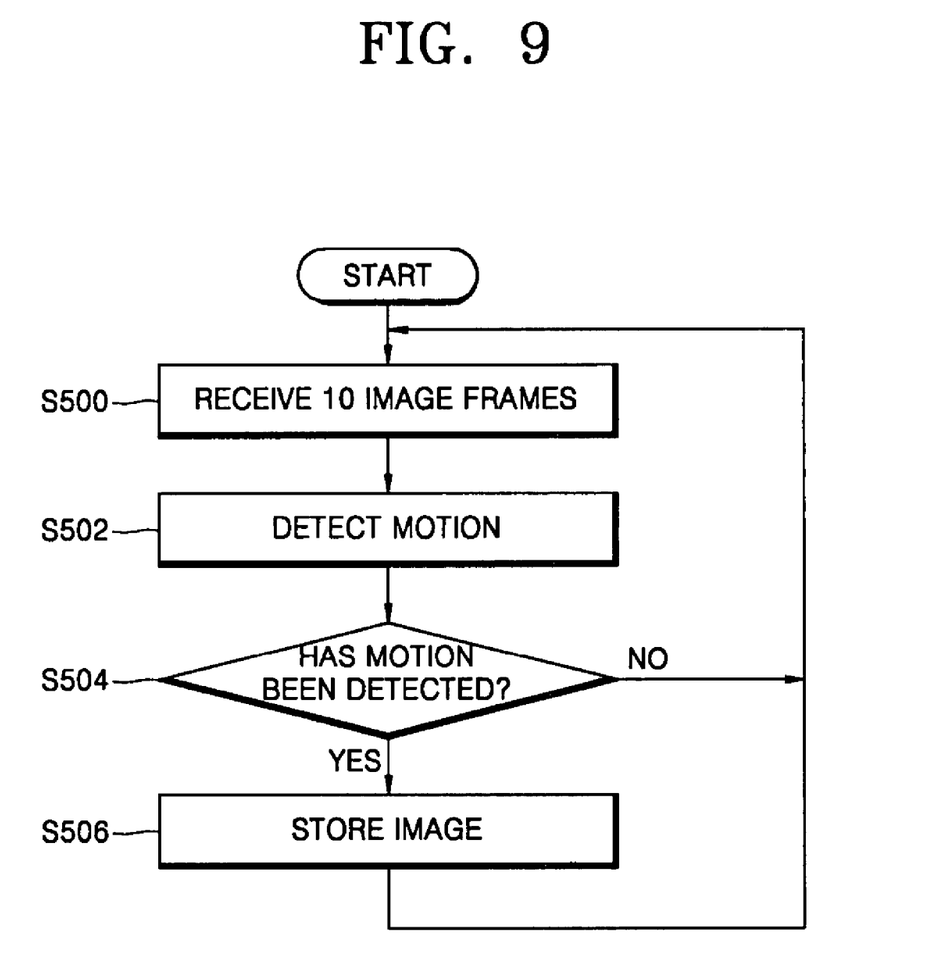
FIG. 9 is a flowchart of a method of detecting a motion in a security system, according to an embodiment of the present invention.

FIG. 9 is a flowchart of a method of detecting a motion in a security system, according to an embodiment of the present invention. The method includes receiving a predetermined number of image frames, detecting a motion using a temporal edge detection algorithm, storing an image when a motion is detected within a predetermined period of time, and continuing a motion detection when a motion is not detected within the predetermined period of time (S500 through S506).

More specifically, the predetermined number of image frames are received in step S500. Next, a motion is detected using the temporal edge detection algorithm and the variance of pixel values with respect to time in step S502. Step S502 can be embodied to include steps S4040 through S4044 shown in FIG. 7.

More specifically, step S502 includes detecting pixels by finding zero crossings of the Laplacian with respect to time using the predetermined number of image frames (step 4040). On the assumption that 2m image frames are received and "n" pixels exist in each image frame, step S4040 can be embodied to include steps S4040a through S4040c shown in FIG. 8.

Step S4040 includes multiplying each image frame in a group of image frames $f(t_1)$ through $f(t_{2m-1})$ by a predetermined weight and then averaging the results of multiplication to obtain $\nabla^2 f(t_m)$ (S4040a), multiplying each image frame in another group of image frames $f(t_2)$ through $f(t_{2m})$ by the predetermined weight and then averaging the results of multiplication to obtain $\nabla^2 f(t_{m+1})$ (S4040b), and determining a pixel of interest as a zero crossing pixel when $\nabla^2 f(t_m)$ is negative and $\nabla^2 f(t_{m+1})$ is positive or when $\nabla^2 f(t_m)$ is positive and $\nabla^2 f(t_{m+1})$ is negative (S4040c). Here, $f(t_1)$ through $f(t_2m)$ denote pixel values of a current pixel of interest under processing. Steps S4040a through S4040c are repeated "n" times.

After step S4040, the variance of pixel values with respect to time is calculated using the predetermined number of image frames in step S4042. The method of detecting a motion may further include performing a Gaussian filtering on the image frames to smooth the image frames before step S4040.

After step S4042, it is determined whether the variance calculated for each zero crossing pixel of the Laplacian is equal to or greater than a predetermined threshold value, and if it is determined the variance is equal to or greater than the predetermined threshold value, the pixel is determined as a motion pixel in step S4044. If it is determined that the variance is less than the predetermined threshold value, it is determined that although there is a temporal change in pixels, this change is a noise-like change caused by illumination not by an actual motion of a subject. Due to step S4044, a method of detecting a motion according to the present invention is robust to noise such as a change in illumination or environment.

After step S502, it is determined whether a motion has been detected in step S504. Preferably, it is determined whether the number of motion pixels is equal to or greater than a predetermined value, and it is determined that a motion has been detected when the number of motion pixels is equal to or greater than the predetermined value.

When it is determined that a motion has not been detected, the operation goes to step S500 without storing the image. When it is determined that a motion has been detected, the image is stored in step S506, and the operation goes to step S500.

Figure 10:
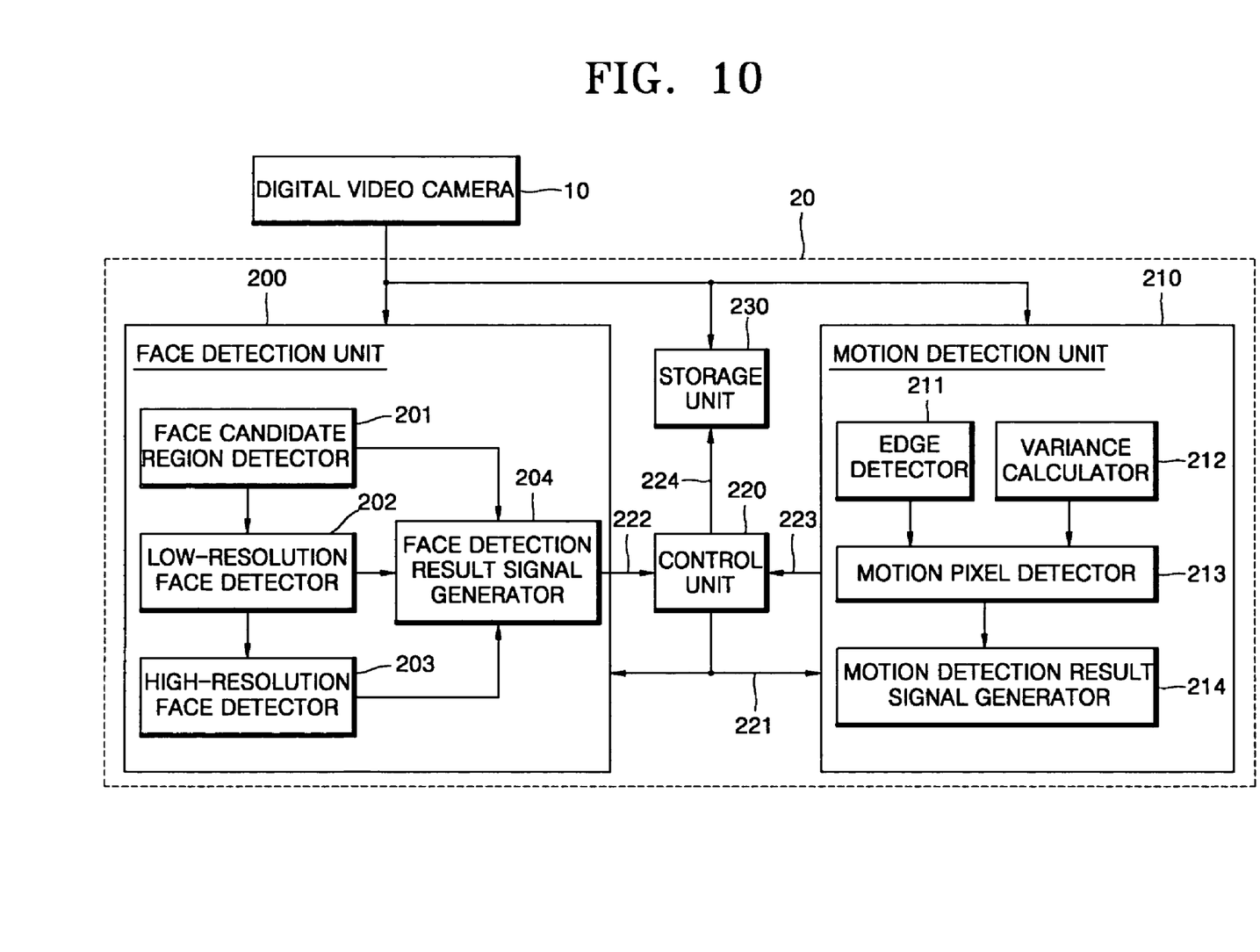
FIG. 10 is a block diagram of a human detection apparatus according to an embodiment of the present invention.

FIG. 10 is a block diagram of an apparatus 20 for detecting a person, according to an embodiment of the present invention. The apparatus 20 includes a face detection unit 200, which detects a face from an image input by a digital video camera 10; a motion detection unit 210, which detects a motion; a control unit 220, which controls a face detection and a motion detection; and a storage unit 230, which stores the image.

The face detection unit 200 performs a face detection on an input image in response to a detection mode signal 221 received from the control unit 220 and outputs a face detection result signal 222 indicating a success or failure of the face detection.

In response to the detection mode signal 221 received from the control unit 220, the motion detection unit 210 receives a predetermined number of image frames at a time, performs a motion detection using a temporal edge detection algorithm, and outputs a motion detection result signal 223 indicating a success or failure of the motion detection.

In response to an image storing command signal 224 received from the control unit 220, the storage unit 230 stores an image input from the digital video camera 10.

The control unit 220 initializes parameters used for a user detection, outputs the detection mode signal 221 activating the face detection unit 200 or the motion detection unit 210, outputs the image storing command signal 224 in response to the face detection result signal 222 or the motion detection result signal 223, counts the number of face detection trials in response to the face detection result signal 222, and counts the number of motion detection trials and the number of motion detection successes in response to the motion detection result signal 223. The control unit 220 outputs the detection mode signal 221 at a high level to activate the motion detection unit 210 when the number of face detection trials is equal to or greater than the first threshold value TH1, for example, 10, and outputs the detection mode signal 221 at a low level to activate the face detection unit 200 when the number of motion detection successes is equal to or greater than the third threshold value TH3, for example, 10, within a predetermined period of time.

Steps S10 and S20 shown in FIG. 1 can be performed by the control unit 220. Step S30 shown in FIG. 1 can be performed by the face detection unit 200, the storage unit 230, and the control unit 240. Step S40 shown in FIG. 1 can be performed by the motion detection unit 210, the storage unit 230, and the control unit 240.

As shown in FIG. 10, the face detection unit 200 includes a face candidate region detector 201, a low-resolution face detector 202, a high-resolution face detector 203, and a face detection result signal generator 204.

The face candidate region detector 201 detects a face candidate region from an image input from the digital video camera 10 using an M-grid Gabor wavelet transformation, outputs the detected face candidate region, and outputs the result of the detection as a first face detection result. For example, when a face candidate region is detected, the first face detection result at a high level may be output. However, when a face candidate region is not detected, the first face detection result at a low level may be output. Steps S304 and S306 shown in FIG. 2 can be performed by the face candidate region detector 201.

The low-resolution face detector 202 detects a face region from a predetermined area including the face candidate region detected by the face candidate region detector 201 using a low-resolution SVM, outputs the detected face region, and outputs the result of the detection as a second face detection result. For example, when a low-resolution face region is detected, the second face detection result at a high level may be output. However, when a low-resolution face region is not detected, the second face detection result at a low level may be output. Steps S308 and S310 shown in FIG. 2 can be performed by the low-resolution face detector 202.

The high-resolution face detector 203 detects a face from a predetermined area including the low-resolution face region detected by the low-resolution face detector 202 using a high-resolution SVM and outputs the result of the detection as a third face detection result. For example, when a high-resolution face is detected, the third face detection result at a high level may be output. However, when a high-resolution face is not detected, the third face detection result at a low level may be output. Steps S312 and S314 shown in FIG. 2 can be performed by the high-resolution face detector 203.

The face detection result signal generator 204 generates the face detection result signal 222 in response to the first through third face detection results. The face detection result signal generator 204 can be embodied to generate the face detection result signal 222 at a low level when any one of the first through third face detection results is at the low level. For example, the face detection result signal generator 204 can be implemented by an AND gate which receives the first through third face detection result through an input terminal.

As shown in FIG. 10, the motion detection unit 210 includes an edge detector 211, a variance calculator 212, a motion pixel detector 213, and a motion detection result signal generator 214.

The edge detector 211 determines an edge pixel by finding a zero crossing of the temporal Laplacian. Step S4040 shown in FIG. 7 can be performed by the edge detector 211.

The variance calculator 212 calculates the variance of pixel values with respect to time. Step S4042 shown in FIG. 7 can be performed by the variance calculator 212.

The motion pixel detector 213 determines the edge pixel as a motion pixel when the variance calculated by the variance calculator 212 is equal to or greater than a predetermined value. Step S4044 shown in FIG. 7 can be performed by the motion pixel detector 213.

The motion detection result signal generator 214 generates the motion detection result signal 223 according to whether the number of motion pixels in an image frame is at least a predetermined value. For example, the motion detection result signal generator 214 can be embodied to generate the motion detection result signal 223 at a high level when the number of motion pixels is at least the predetermined value and generate the motion detection result signal 223 at a low level when the number of motion pixels is less than the predetermined value.

As described above, in a human detection method and apparatus according to the present invention, a face detection and a motion detection are repeatedly or complementarily performed while a system is operated so that an accurate detection, a high speed of execution, and high storage use efficiency of acquired images can be achieved. In addition, an actual motion of a subject can be accurately detected without being affected by noise such as a change in illumination or environment.

Although a few embodiments of the present invention have been shown and described, it will be appreciated by those skilled in the art that changes may be made in these elements without departing from the spirit and scope of the invention, the scope of which is defined in the appended claims and their equivalents.

What is claimed is:

1. A method of detecting a motion from an image provided by a digital video camera, the method comprising:
   (e1) receiving a predetermined number of image frames;
   (e2) detecting a motion in the image frames using the temporal edge detection algorithm and variance of pixel values with respect to time; and
   (d4) when it is determined that a motion has been detected, storing the image;
   wherein step (e2) comprises:
   (e20) detecting pixels by finding zero crossings of a Laplacian with respect to time using the predetermined number of image frames, wherein the predetermined number of image frames is classified into two groups such that a first group is $f(t_1)$ through $f(t_{2m-1})$ and a second group is $f(t_2)$ through $f(t_{2m})$, and the Laplacian is obtained with respect to time of the two groups;
   (e22) calculating the variance of pixel values with respect to time using the two groups of the predetermined number of image frames; and
   (e24) determining whether the variance calculated for each zero crossing pixel of the Laplacian is equal to or greater than a predetermined value, and determining that a detected pixel whose variance is equal to or greater than the predetermined value is a motion pixel.

2. The method of claim 1, wherein when 2m image frames are received and "n" pixels exist in each image frame, step (e20) comprises:
   (e200) multiplying each of $f(t_1)$ through $f(t_{2m-1})$ in a group of image frames by a predetermined weight and then averaging the results of multiplication to obtain $\nabla^2 f(t_m)$;
   (e202) multiplying each of $f(t_2)$ through $f(t_{2m})$ in another group of image frames by a predetermined weight and then averaging the results of multiplication to obtain $\nabla^2 f(t_{m+1})$; and
   (e204) determining a pixel of interest as a zero crossing pixel when $\nabla^2 f(t_m)$ is negative and $\nabla^2 f(t_{m+1})$ is positive or when $\nabla^2 f(t_m)$ is positive and $\nabla_2 f(t_{m+1})$ is negative,
   wherein $f(t_1)$ through $f(t_{2m})$ denote pixel values of the pixel of interest under processing, and steps (e200) through (e204) are repeated "n" times.

3. The method of claim 1, wherein step (e3) comprises determining whether the number of pixels determined as motion pixels in step (e2) is equal to or greater than a predetermined value and determining that a motion has been detected when it is determined that the number of motion pixels is at least the predetermined value.

4. The method of claim 1, further comprising performing a Gaussian filtering on the received image frames to smooth the image frames before step (e20).

5. An apparatus of detecting a motion from an image provided by a digital video camera, the apparatus comprising:
means for receiving a predetermined number of image frames;
means for detecting a motion in the image frames using the temporal edge detection algorithm and variance of pixel values with respect to time; and
means for storing the image when it is determined that a motion has been detected;
wherein the means for detecting a motion in the photographed image comprises:
means for detecting pixels by finding zero crossings of a Laplacian with respect to time using the predetermined number of image frames, wherein the predetermined number of image frames is classified into two groups such that a first groups is $f(t_1)$ through $f(t_{2m-1})$ and a second group is $f(t_2)$ through $f(t_{2m})$, and the Laplacian is obtained with respect to time of the two groups;
means for calculating the variance of pixel values with respect to time using the predetermined number of image frames; and
means for determining whether the variance calculated for each zero crossing pixel of the Laplacian is equal to or greater than a predetermined value, and determining that a detected pixel whose variance is equal to or greater than the predetermined value is a motion pixel.

6. The apparatus of claim 5, wherein the means for detecting pixels by finding zero crossings of the Laplacian with respect to pixel coordinates and time comprises:
means for multiplying each of $f(t_1)$ through $f(t_{2m-1})$ in a group of image frames by a predetermined weight and then averaging the results of multiplication to obtain Laplacian of $f(t_m)$ with respect to time, i.e., $\nabla^2 f(t_m)$;
means for multiplying each of $f(t_2)$ through $f(t_{2m})$ in another group of image frames by a predetermined weight and then averaging the results of multiplication to obtain Laplacian of $f(t_{m+1})$ with respect to time, i.e., $\nabla^2 f(t_{m+1})$; and
means for determining a pixel of interest as a zero crossing pixel when $\nabla^2 f(t_m)$ is negative and $\nabla^2 f(t_{m+1})$ is positive or when $\nabla^2 f(t_m)$ is positive and $\nabla^2 f(t_{m+1})$ is negative,
wherein 2m image frames are received, "n" pixels exist in each image frame, $f(t_1)$ through $f(t_{2m})$ denote pixel values of the pixel of interest under processing, and operations of the above three means are repeated "n" times.

7. The apparatus of claim 5, wherein the means for determining whether a motion has been detected comprises a means for determining whether the number of pixels determined as motion pixels is equal to or greater than a predetermined value and determining that a motion has been detected when it is determined that the number of motion pixels is equal to or greater than the predetermined value.

8. The apparatus of claim 5, further comprising a means for performing a Gaussian filtering on the received image frames to smooth the image frames and transmitting the smoothed image frames to the means for detecting a motion in the photographed image.

9. A method of detecting a motion from an image provided by a digital video camera, the method comprising:
(e1) receiving a predetermined number of image frames;
(e2) detecting a motion in the image frames using the temporal edge detection algorithm and variance of pixel values with respect to time; and
(d4) when it is determined that a motion has been detected, storing the image;
wherein step (e2) comprises:
(e20) detecting pixels by finding temporal image intensity changes using the predetermined number of image frames, wherein the predetermined number of image frames is classified into two groups such that a first group is $f(t_1)$ through $f(t_{2m-1})$ and a second group is $f(t_2)$ through $f(t_{2m})$, and the Larlacian is obtained with respect to time of the two groups;
(e22) calculating the variance of pixel values with respect to time using the predetermined number of image frames; and
(e24) determining whether the variance calculated for each of the detected pixels is equal to or greater than a predetermined value, and determining that a detected pixel whose variance is equal to or greater than the predetermined value is a motion pixel.

10. The method of claim 9, wherein the temporal image intensity changes are found by zero crossings of a Laplacian.

11. The method of claim 9, wherein when 2m image frames are received and "n" pixels exist in each image frame, step (e20) comprises:
(e200) multiplying each of $f(t_1)$ through $f(t_{2m-1})$ in a group of image frames by a predetermined weight and then averaging the results of multiplication to obtain $\nabla^2 f(t_m)$;
(e202) multiplying each of $f(t_2)$ through $f(t_{2m})$ in another group of image frames by a predetermined weight and then averaging the results of multiplication to obtain $\nabla^2 f(t_{m+1})$; and
(e204) determining a pixel of interest as a zero crossing pixel when $\nabla^2 f(t_m)$ is negative and $\nabla^2 f(t_{m+1})$ is positive or when $\nabla^2 f(t_m)$ is positive and $\nabla^2 f(t_{m+1})$ is negative,
wherein $f(t_1)$ through $f(t_{2m})$ denote pixel values of the pixel of interest under processing, and steps (e200) through (e204) are repeated "n" times.

12. The method of claim 9, wherein step (e3) comprises determining whether the number of pixels determined as motion pixels in step (e2) is equal to or greater than a predetermined value and determining that a motion has been detected when it is determined that the number of motion pixels is at least the predetermined value.

13. The method of claim 9, further comprising performing a Gaussian filtering on the received image frames to smooth the image frames before step (e20).

14. An apparatus of detecting a motion from an image provided by a digital video camera, the apparatus comprising:
means for receiving a predetermined number of image frames;
means for detecting a motion in the image frames using the temporal edge detection algorithm and variance of pixel values with respect to time; and
means for storing the image when it is determined that a motion has been detected;
wherein the means for detecting a motion in the photographed image comprises:
means for detecting pixels by finding temporal image intensity changes using the predetermined number of image frames, wherein the predetermined number of image frames is classified into two groups such that a first group is $f(t_1)$ through $f(t_{2m-1})$ and a second group is $f(t_2)$ through $f(t_{2m})$, and the Laplacian is obtained with respect to time of the two groups;

means for calculating the variance of pixel values with respect to time using the predetermined number of image frames; and means for determining whether the variance calculated for each of the detected pixels is equal to or greater than a predetermined value, and determining that a detected pixel whose variance is equal to or greater than the predetermined value is a motion pixel.

15. The method of claim 14, wherein the temporal image intensity changes are found by zero crossings of a Laplacian.

16. The apparatus of claim 15, wherein the means for detecting pixels by finding zero crossings of the Laplacian with respect to pixel coordinates and time comprises:

means for multiplying each of $f(t_1)$ through $f(t_{2m-1})$ in a group of image frames by a predetermined weight and then averaging the results of multiplication to obtain Laplacian of $f(t_m)$ with respect to time, i.e., $\nabla^2 f(t_m)$;

means for multiplying each of $f(t_2)$ through $f(t_{2m})$ in another group of image frames by a predetermined weight and then averaging the results of multiplication to obtain Laplacian of $f(t_{m+1})$ with respect to time, i.e., $\nabla^2 f(t_{m+1})$; and means for determining a pixel of interest as a zero crossing pixel when $\nabla^2 f(t_m)$ is negative and $\nabla^2 f(t_{m+1})$ is positive or when $\nabla^2 f(t_m)$ is positive and $\nabla^2 f(t_{m+1})$ is negative, wherein 2m image frames are received, "n" pixels exist in each image frame, $f(t_1)$ through $f(t_{2m})$ denote pixel values of the pixel of interest under processing, and operations of the above three means are repeated "n" times.

17. The apparatus of claim 14, wherein the means for determining whether a motion has been detected comprises a means for determining whether the number of pixels determined as motion pixels is equal to or greater than a predetermined value and determining that a motion has been detected when it is determined that the number of motion pixels is equal to or greater than the predetermined value.

18. The apparatus of claim 14, further comprising a means for performing a Gaussian filtering on the received image frames to smooth the image frames and transmitting the smoothed image frames to the means for detecting a motion in the photographed image.

* * * * *